INVENTORS A.C.BECK
H.T.FRIIS
BY
J.W.Schmied
ATTORNEY

Patented Mar. 3, 1953

2,630,489

UNITED STATES PATENT OFFICE 2,630,489

WAVE GUIDE JOINT

Alfred C. Beck, Red Bank, and Harald T. Friis, Rumson, N. J., assignors to Bell Telephone Laboratories, Incorporated, New York, N. Y., a corporation of New York Application November 6, 1945, Serial No. 627,066

11 Claims. (Cl. 178—44)

This invention relates to wave guides, and more particularly to longitudinally adjustable joints in wave guides.

Joints of the kind in question may be used for a variety of purposes. As one example of useful application it may be pointed out that long wave guides are usually made of copper, brass or other conductive material having a relatively large coefficient of expansion. Joints of the present type may be used as an expansion joint in a wave guide or wave guide system. Numerous other applications may arise wherein it is desired to increase or decrease the effective or total length of a wave guide during use of the same for electrical transmission or without disturbing the transmission. The separate sections of the guide in the case of an expansion joint may move relatively to one another as a result of temperature changes expanding or contracting the parts. However, for other applications, parts of the guide may be operated with respect to one another by hand or by power-driven devices. In some cases the total movement may be quite considerable, up to several inches or several feet, in comparison with the relatively smaller movement necessary in an expansion joint.

In a typical and exemplary embodiment of the invention the joint consists of an external wave guide member into which a smaller member of lesser diameter extends for whatever distance is necessary under the particular circumstances of use. It has been found that electrical problems arise in connection with such an arrangement. It is not sufficient merely that one guide or pipe be slid into another in which it fits rather tightly. Even with tight-fitting members, a considerable energy loss occurs as a result of the electromagnetic wave energy leaking out of the crack between the two members. Furthermore, inasmuch as wave guides are required to possess substantial mechanical strength, the thickness of the pipes or tubes constituting them must oftentimes be quite considerable. This results in a change of diameter at the transition between the large guide member and the small guide member which results in energy reflections and, moreover, because these energy reflections vary in distance from a wave energy source or a wave energy absorber placed along the guide, variations of impedance will appear at the source or at the absorber.

Consequently, an object of the invention is to provide an arrangement which eliminates or minimizes the difficulties inherent in longitudinally sliding joints in wave guides.

Figure 1:
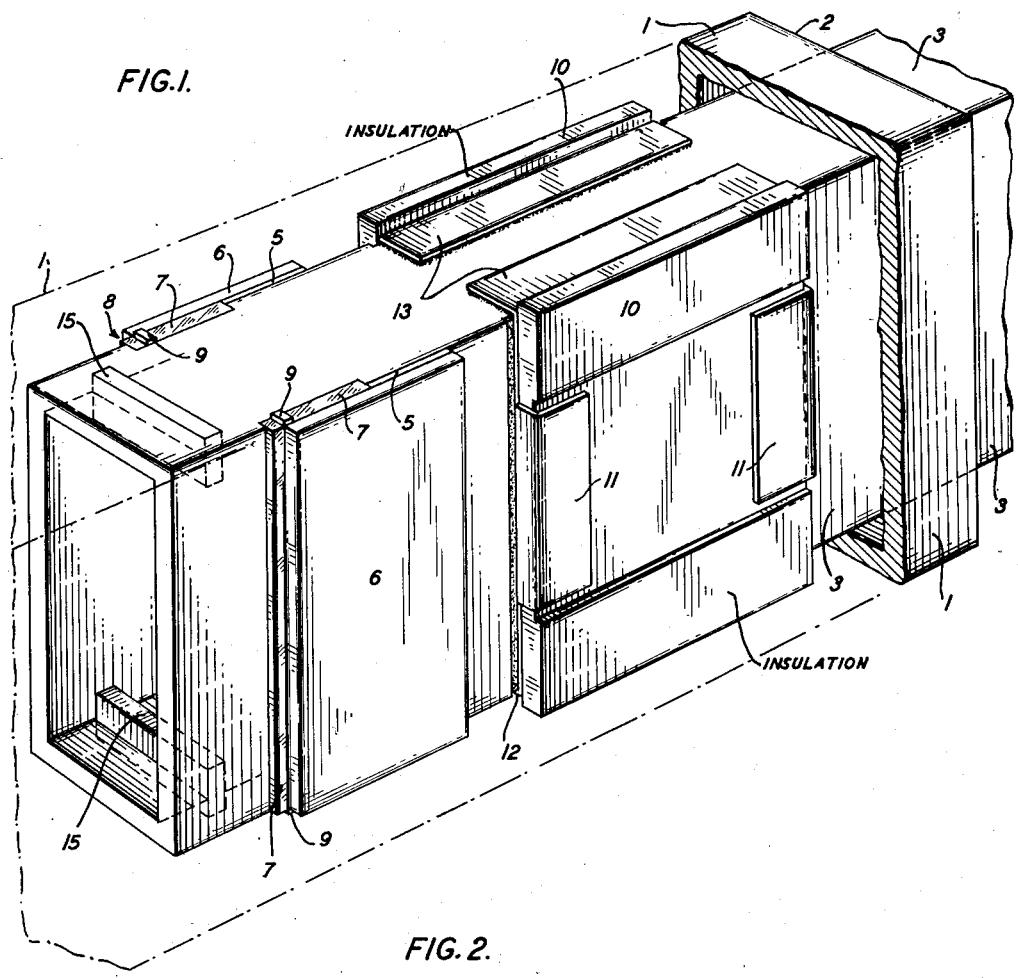
Figure 2:
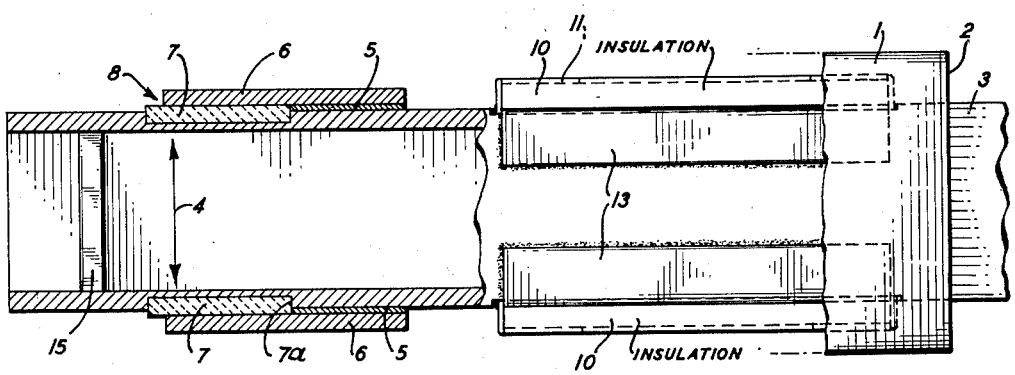

In the exemplary embodiment of the invention illustrated in the accompanying drawings:

Fig. 1 is a perspective view of a wave guide joint with the outer guide member broken away to show the structure at the end of the inner guide member which structure largely embodies and exemplifies features of the invention; and Fig. 2 is a cross-sectional view taken laterally through the central portion of the end of the inner wave guide member.

In the drawings the outer guide member 1 may be assumed to be terminated at a point 2 but to extend indefinitely to the left. The inner guide member 3 has an end slidably mounted in the outer guide member 1, and the inner guide member in turn extends indefinitely to the right. The inner guide member comprises several features of construction which will now be discussed.

This particular guide as illustrated is a rectangular guide and may be assumed to transmit waves of the $TE_{1,0}$ type, sometimes designated the dominant wave. In such waves the lines of electric force are generally transverse as indicated by the arrow 4.

In an arrangement in which one hollow pipe is merely fitted into another, it will be found that electromagnetic power leaks out through the crack between the guide members and out into space beyond the wave guides. Not only is this loss of power undesirable but in the case of high power equipment the electric energy escaping from the guide may set up serious disturbances in the neighborhood when picked up by adjacent coils, wires, tubes and other equipment and may even cause sparking to the extent of being a fire hazard between the parts of metallic or similar machinery and equipment which is non-electrical in nature. To reduce the loss of wave energy from the guide joint, a wave trap is provided on the outer sides of the smaller guide member opposite to the inner surfaces at which the electric lines of force terminate.

This wave trap consists, mechanically speaking, of a thin shim 5 which may consist of a good thick layer of solder or brazing material to which a plate 6 is brazed or soldered so that the inner guide 3, the shim 5 and the plate 6 form a solid structure. A portion of the wall of guide 3 is cut away to form a space which may be filled with dielectric material such as polystyrene 7. However, the space occupied by the polystyrene 7 may be left empty of anything except air although in such case the space would need to be longer because the velocity of transmission of electric waves through polystyrene is higher than through air. Any other well recognized dielectric having the properties of polystyrene may be used in place of the element 7. These elements 5, 6 and 7 are duplicated on the opposite side of the inner wave guide. The closed end 7a of the space occupied by the element 7 comprises a short circuit and is located a half wavelength from the end of the smaller or inner guide. Approximately halfway between the surface 7a and the end of the inner guide there is an opening 8 into the space occupied by the element 7 and this opening is located approximately a quarter wavelength from the end of the wave guide. With this structure it has been found that the wave energy leaking out or traversing the space between the inner and outer guides is greatly reduced. It has not been found necessary to locate any similar trapping means on the other two faces of the guides because the electric intensity falls off as this space is approached and is of very low or negligible value at the extreme sides. It has been found, however, in the case of high power equipment, that destructive or undesirable sparking tends to occur between the corner of plate 6 and the adjacent portions of the guide member 3. To prevent this, very small conductive plates 9 are connected conductively across between an edge of the plate 6 at its corner and the main body of the guide member 3.

Located beyond the plate 6 and away from the end of the guide, two pieces 10 of insulating material, which preferably may consist of material known as "Bakelite," are rigidly attached to the inner guide by being mounted in bent-over flanges 11 of a thin metallic plate 12 which is soldered, brazed or otherwise rigidly attached to the main body of the guide member 3. At the top and bottom of these flanges additional bent-over members 13 may be provided to form a more firm and secure structure as a result of welding, brazing or soldering the bent-over portions 13 to the main body of the guide 3. The thicker portions of the insulating material 10 form the side bearings of the principal frictional engagement between the inner and outer guide and the end surfaces of the insulating members 10 form the principal bearing surfaces between the narrower portions of the inner and outer guides.

In addition to forming bearing surfaces the members 10 perform another useful function in that they further reduce any wave energy which passes by the wave trap otherwise known as a wave choke consisting of members 6, 7, 8, previously described. This energy is largely dissipated in heat because the dielectric material used is highly dissipative for electromagnetic waves.

We have found that the joint as so far described is not very smooth electrically, by which is meant that power flow through the guide tends to suffer reflections at the joint due to the change in wave guide size. Unless some means are taken to avoid such reflections some of the power is reflected back and in one embodiment tends to produce a standing wave ratio of about 2.5 decibels in both the large guide and the small guide. In constructions wherein the length of the guide changes due to the use of a sliding joint of this type, such reflections are particularly undesirable because as the guide length changes the impedance measured from any particular point down the large guide towards the joint becomes variable as the guide members slide in and out of one another to change the effective guide length. In order to greatly reduce this reflection of energy and reduce the standing wave ratio, small plate members 15 are firmly set into slots in the narrow sides of the inner guide member 3. These plate members 15 project into the guide a short distance and comprise an inductive iris. When located a suitable distance from the end of the guide and when mounted in the narrow side of the guide these plates constitute an inductive iris. The amount of projection of the plates 15 into the guide and the distance of the center of the plates from the end of the guide have been determined experimentally. These are related to the thickness of the plates 15 measured longitudinally along the guide. In speaking of the distance of the plates from the end of the guide it is understood that this distance is a function of the mean wavelength which the guide is expected to transmit. With an iris structure of this kind it has been found that the wave reflection is very largely cancelled or neutralized so that the standing wave ratio and impedance variations are considerably reduced. In fact, with such a structure the wave guide joint is quite "smooth" from an electrical standpoint.

Results somewhat similar may be obtained by placing iris forming members in the sides, that is, the long sides of the inner guide, in which case they form what is known as a capacitative iris. For various reasons it is considered that the inductive iris is more effective than the capacitative iris. Among other reasons, iris members set in the long sides of the guide approach each other relatively closely and in the case of a small guide, sparking or electrical breakdown at the iris may result.

Although illustrated as a longitudinally extensible or trombone type wave guide joint in a rectangular guide which supports waves of the $TE_{1,0}$ type, it is not considered that the principles of the invention are limited to rectangular guides or to waves of this type. These principles may be extended to the case of wave guides supporting or transmitting waves of other modes of both the TE type and the TM types in rectangular guides and also to waves of various types in guides of circular, elliptical or other cross-sections.

"Wave guides," according to this specification, are elongated tubular uniconductors for the transmission of electrical wave energy such as are discussed in chapter 14, pages 455 to 487 under the title "Hollow wave guides" or merely "Wave guide" in the book entitled "Ultra-High Frequency Techniques" by Brainerd, Koehler, Reich and Woodruff, 15th printing, December 1943, by D. Van Nostrand Company, Inc.

What is claimed is:

1. An electromagnetic wave trap comprising members arranged about a body of solid dielectric of parallelepipoidal form thin with respect to its length and breadth, the length of the trap being defined as the dimension parallel to the direction of wave transmission, comprising (a) a body of conductive material contacting one side of the body, (b) conductive material solidly abutting and bounding one end of the body, (c) conductive material contacting one side of the body opposite to (a) but leaving a narrow strip of the body of said dielectric exposed at one end thereof, the edges of the body of said dielectric being bounded and closed to some extent by conductive members solidly conductively connecting (a) and (c).

2. A trap according to claim 1, wherein the conductive members are narrow longitudinally and laterally and lie close to the exposed end of the body of said dielectric.

3. A telescopingly adjustable wave guide joint comprising a wave guide member of smaller cross-section fitting slidably into a wave guide member of larger cross-section for intertransfer of electrical energy from one guide member to the other and including an iris forming member attached to and projecting internally into the said one guide member at a point located a short distance from the end of the inner member, the inner guide member extending in a longitudinal direction indefinitely beyond the iris away from the said end.

4. In a wave guide joint comprising an inner guide member and an outer guide member of which the inner guide member is smaller in cross-sectional dimension and fits into the outer guide member with a sliding fit, insulating means comprising the sole physical bearing or contact means between said members, as an element of means for coupling said sections to form a composite guide, iris means comprising plates oppositely extending into and rigidly conductively attached to said inner member near to but somewhat removed from the end thereof.

5. An electromagnetic wave guide joint whereby the mechanical length of a wave guide may be varied with a minimum change of transmission therethrough comprising an inner member and an outer member into which the inner member telescopingly fits, the inner member having trap means on its outer surface, said trap means including a chamber having its terminus toward the end of the inner member open, i. e. not closed by conductive material, and its terminus away from the end of the inner member closed, i. e. blocked with conductive material, said chamber being laterally thin and having its inner and outer larger surfaces bounded by conductive material, said chamber being filled with dielectric material, such material including inter alia, atmosphere, the chamber having its nearer end at $(x+\frac{1}{4})$ wavelength from the end of the guide and being longitudinally $(x+\frac{1}{4})$ wavelength in length, in combination with iris means inside the inner guide member near the end thereof, and highly insulating material affixed to at least one of said inner and outer members in a form with extended surface to form a bearing between said members consisting of said insulating material exclusive of conductive material-to-conductive material contact, $x$ being zero or any integer and the wavelength being any wavelength to be transmitted within the guide within the limits of measurement.

6. A longitudinally adjustable joint for a wave guide consisting of an outer wave guide member, an inner wave guide member slidably fitting into said outer wave guide member, said inner wave guide member being provided with electromagnetic wave traps each comprising members arranged about a parallelepipoidal space of thickness small with respect to its length and breadth, the length of each trap being defined as the dimension parallel to the direction of wave transmission, each trap comprising (a) conductive material defining one side of the space, (b) conductive material solidly closing and defining one end of the space, and (c) conductive material defining a side of the space opposite to (a) but leaving an entrance gap at one end thereof, the edges of the space being bounded and closed to some extent by conductive members solidly conductively connecting (a) and (c), said traps being arranged in image relation to each other on opposite outer faces of the guide near the end of the section in combination with iris means within the guide near the end of the section.

7. A longitudinally adjustable joint for wave guides comprising an inner member and an outer member into the end of which the inner member is adapted to slidingly fit, the inner member having on its external surface an electromagnetic wave trap comprising members arranged about a parallelepipoidal space of thickness small with respect to its length and breadth, the length of the trap being defined as the dimension parallel to the direction of wave transmission, comprising (a) conductive material defining one side of the space, (b) conductive material solidly closing and defining one end of the space, and (c) conductive material defining a side of the space opposite to (a) but leaving an entrance gap at one end thereof, the edges of the space being bounded and closed to some extent by conductive members solidly conductively connecting (a) and (c), in which the said trap means is near an end of the inner member and wherein there are iris means provided inside the inner member.

8. A longitudinally adjustable joint for wave guides comprising an inner member and an outer member into the end of which the inner member is adapted to slidingly fit, the inner member having on its external surface an electromagnetic wave trap comprising members arranged about a parallelepipoidal space of thickness small with respect to its length and breadth, the length of the trap being defined as the dimension parallel to the direction of wave transmission, comprising (a) conductive material defining one side of the space, (b) conductive material solidly closing and defining one end of the space, and (c) conductive material defining a side of the space opposite to (a) but leaving an entrance gap at one end thereof, the edges of the space being bounded and closed to some extent by conductive members solidly conductively connecting (a) and (c), in which there are two said trap means on opposite outer faces of the inner member, and in which iris means are provided attached to the inside of the inner member upon the sides of the member which are at angles to the sides upon which the trap means are located.

9. A longitudinally adjustable joint for wave guides comprising an inner member and an outer member into the end of which the inner member is adapted to slidingly fit, the inner member having on its external surface an electromagnetic wave trap comprising members arranged about a parallelepipoidal space of thickness small with respect to its length and breadth, the length of the trap being defined as the dimension parallel to the direction of wave transmission, comprising (a) conductive material defining one side of the space, (b) conductive material solidly closing and defining one end of the space, and (c) conductive material defining a side of the space opposite to (a) but leaving an entrance gap at one end thereof, the edges of the space being bounded and closed to some extent by conductive members solidly conductively connecting (a) and (c), in which the said trap means is near an end of the inner member and wherein there are iris means fixedly mounted within the inner member at a point nearer the said end than the trap means.

10. A longitudinally adjustable joint for wave guides comprising an inner guide member and an outer guide member into the end of which the inner member is adapted to slidingly fit, the inner member having on its external surface an electromagnetic wave trap comprising material arranged about a parallelepipoidal space of thickness small with respect to its length and breadth, the length of the trap being defined as the dimension parallel to the direction of wave transmission, comprising (a) conductive material defining one side of the space, (b) conductive material solidly closing and defining one end of the space, and (c) conductive material defining a side of the space opposite to (a) but leaving an entrance gap at one end thereof, the edges of the space being bounded and closed to some extent by conductive material solidly conductively connecting (a) and (c), wherein the nearest part of the trap means to the end of the guide is $(x+\frac{1}{4})$ wavelength therefrom, and iris means consisting of plates relatively thin in a longitudinal direction extending across and partially obstructing the inner guide member and located within and at $(x+\frac{1}{8})$ wavelength from the end of the inner guide member, $x$ being zero or any integer, and the wavelength being the wavelength of a wave for the transmission of which the wave guide joint is designed.

11. A telescopingly adjustable wave guide joint comprising a wave guide member of smaller cross-section fitting slidably into a wave guide member of larger cross-section for intertransfer of electrical energy from one guide member to the other and including an iris forming member attached to and projecting internally into the said one guide member at a point located a short distance from the end of the inner member, the inner guide member extending in a longitudinal direction indefinitely beyond the iris away from the said end, wherein at least one of the members has attached thereto guiding and bearing means of highly insulating material of sufficient length and width whereby the physical sliding contact between the member consists solely of contact between said insulating material bearing against other material.

ALFRED C. BECK.
HARALD T. FRIIS.

REFERENCES CITED

The following references are of record in the file of this patent:

UNITED STATES PATENTS

| Number | Name | Date |
| --- | --- | --- |
| 1,921,117 | Darbord | Aug. 8, 1933 |
| 2,151,118 | King | Mar. 21, 1939 |
| 2,165,961 | Cork | July 11, 1939 |
| 2,396,044 | Fox | Mar. 5, 1946 |
| 2,400,777 | Okress | May 21, 1946 |
| 2,404,086 | Okress | July 16, 1946 |
| 2,407,318 | Mieher | Sept. 10, 1946 |
| 2,427,100 | Kihn | Sept. 9, 1947 |
| 2,433,368 | Johnson | Dec. 30, 1947 |
| 2,434,509 | Okress | Jan. 13, 1948 |
| 2,451,876 | Salisbury | Oct. 19, 1948 |
| 2,465,719 | Fernsler | Mar. 29, 1949 |
| 2,479,220 | Early | Aug. 16, 1949 |
| 2,489,131 | Hegbar | Nov. 22, 1949 |
| 2,514,544 | Hansen | July 11, 1950 |
| 2,543,721 | Collard | Feb. 27, 1951 |
| 2,544,842 | Lawson | Mar. 13, 1951 |

FOREIGN PATENTS

| Number | Country | Date |
| --- | --- | --- |
| 503,467 | Great Britain | Apr. 6, 1939 |